H. HULL.
COOKER.
APPLICATION FILED FEB. 2, 1921. RENEWED JAN. 19, 1922.
1,421,480.
Patented July 4, 1922.
2 SHEETS—SHEET 1.
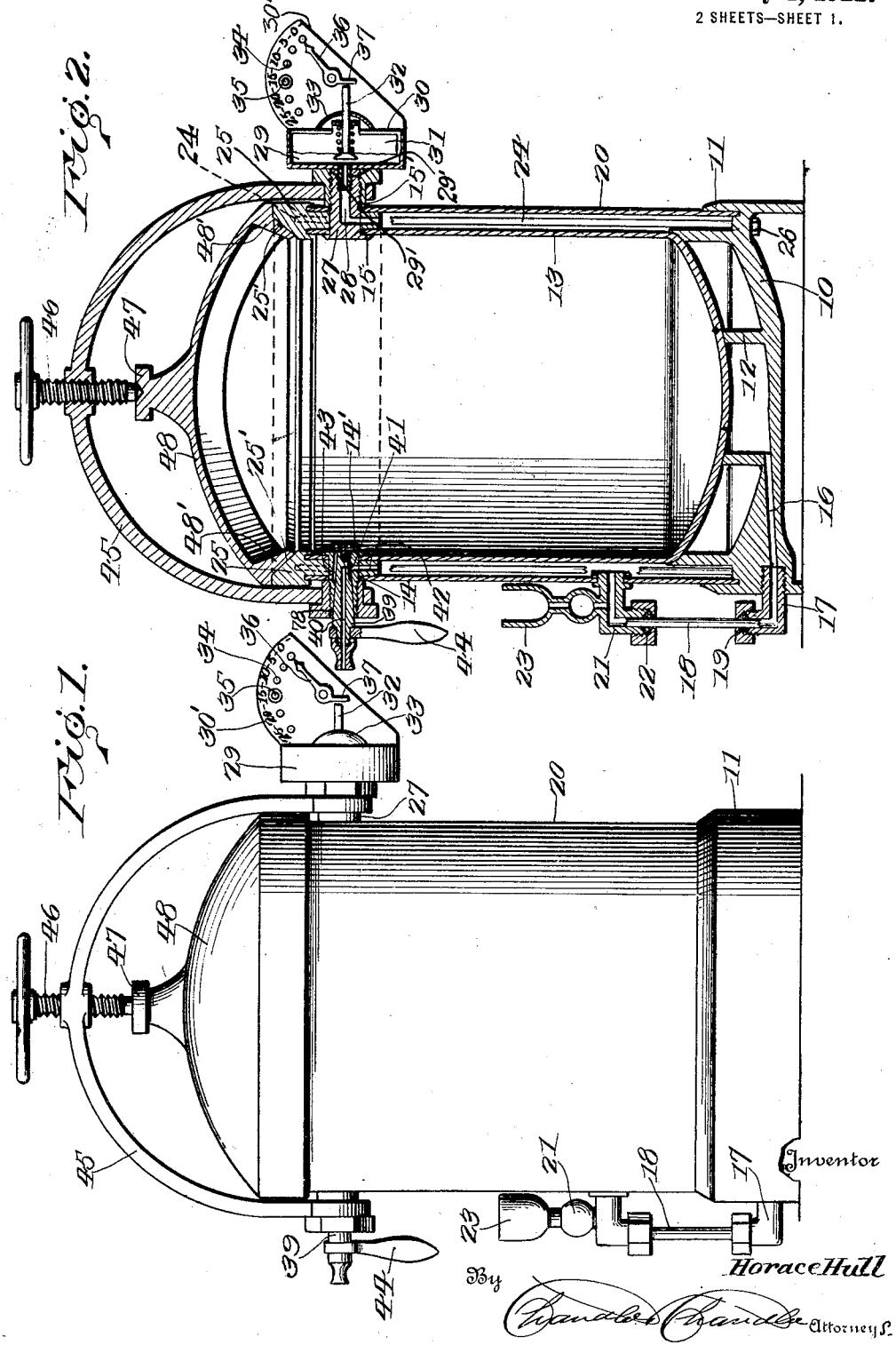
Inventor
Horace Hull
By
Chandler & Chandler
Attorneys H. HULL.
COOKER.
APPLICATION FILED FEB. 2, 1921. RENEWED JAN. 19, 1922.
1,421,480.
Patented July 4, 1922.
2 SHEETS—SHEET 2.
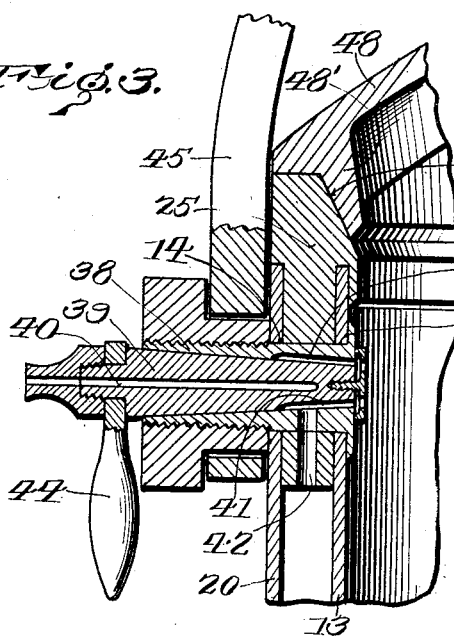
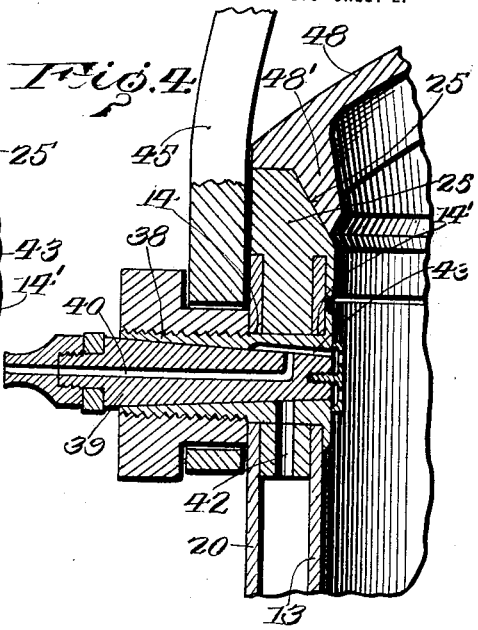
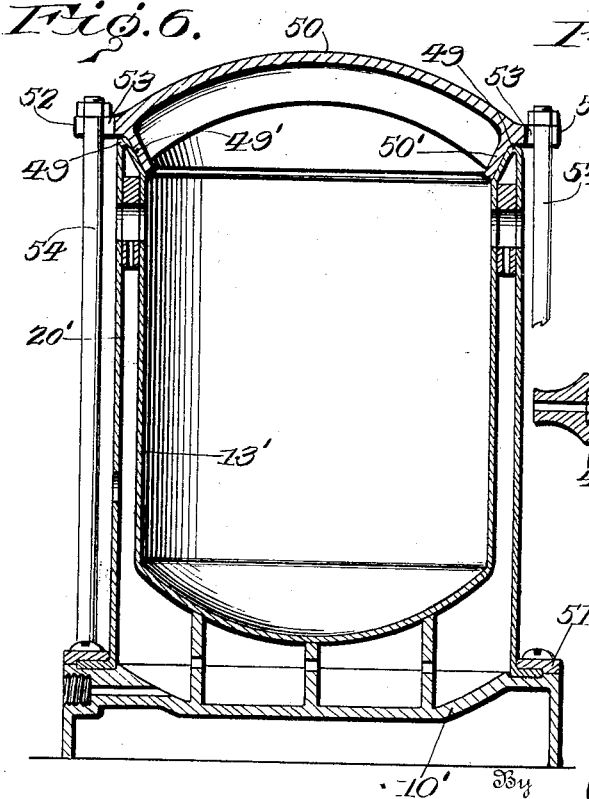
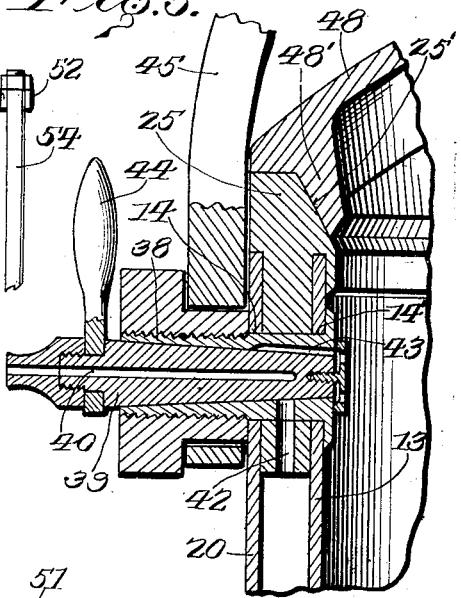
Inventor
Horace Hull
By
Attorneys

UNITED STATES PATENT OFFICE.

HORACE HULL, OF DENVER, COLORADO, ASSIGNOR OF ONE-HALF TO L. A. BASTIN AND ONE-HALF TO JOHN H. POST, BOTH OF DENVER, COLORADO.

COOKER.

1,421,480.  Specification of Letters Patent.  Patented July 4, 1922.

Application filed February 2, 1921, Serial No. 441,856. Renewed January 19, 1922. Serial No. 530,492.

*To all whom it may concern:*

Be it known that I, HORACE HULL, a citizen of the United States, residing at Denver, in the county of Denver, State of Colorado, have invented certain new and useful Improvements in Cookers; and I do hereby declare the following to be a full, clear, and exact description of the invention, such as will enable other skilled in the art to which it appertains to make and use the same.

This invention relates to new and useful improvements in cooking devices.

One object of the invention is to provide a cooking device which is operable to cook food stuffs by the employment of the heat of steam against the exterior of the food receptacle or container, against the food within the container, by means of vacuum and the inherent heat in the food which has been partially cooked, after the manner of a fireless cooker.

Another object is to provide a cooking device of this character in which the flow of steam can be maintained outwardly of the food receptacle, directed into the interior thereof, or exhausted to the atmosphere to create a vacuum between the container and the outer surrounding vessel.

Other objects and advantages will be apparent from the following description when taken in connection with the accompanying drawings.

In the drawing:

Figure 1 is a side elevation of a cooker made in accordance with the invention.

Figure 2 is a vertical longitudinal central sectional view through the cooker.

Figure 3 is an enlarged vertical sectional view through the steam controlling valve showing the valve in position to admit steam to the interior of the food container, from the space within the surrounding jacket.

Figure 4 is a sectional view similar to that of Figure 3, but showing the valve in position to permit the escape of the steam arising from the cooking food to the atmosphere.

Figure 5 is a sectional view of the valve showing the same in position to maintain a vacuum within the jacket.

Figure 6 is a vertical longitudinal sectional view through a modification of the container and jacket, showing the walls of the same formed from a single sheet of metal.

Referring particularly to the accompanying drawings 10 represents a concave-convex base having the channeled surrounding flange 11, and the upwardly extending lugs 12. Seated on the lugs 12 is the downwardly bowed bottom of the food container 13, the upper portions of the side walls of which, at diametrically opposite points, being formed with openings 14 and 15, respectively, the purpose of which will appear herein, later. Formed to extend horizontally from the outer side face of the bottom or base 10, to the intermediate portion of the upper face of said base, is a passage 16, the outer end of which has engaged therein the pipe elbow 17. The upturned end of the elbow 17 supports the lower end of the water gage glass 18, a packing gland 19 being disposed at the junction of said glass and elbow.

Disposed with its lower edge in the before-mentioned channel of the base 10, is an outer shell or jacket 20, which is spaced from the wall of the container 13. In one side of this shell or jacket, at a point a short distance above the bottom, is a second elbow 21, carrying a packing gland 22, and retaining the upper end of the gage glass 18. Formed on the upper side of the elbow 21, is a valved filling cup 23, by means of which water is poured into the space between the jacket and the container. Extending upwardly through the bottom, and through the space between the jacket and container, are rods 24, the upper ends of which are engaged in a ring 25 seated on the upper edges of the walls of the jacket and container, clamping nuts 26 being engaged on the lower ends of said bolts to firmly clamp the parts together, as will be readily understood.

Disposed through the opening 15, in the wall of the container, and through a similar opening 15′, in the jacket wall, is a plug 27 having a right angular passage 28 therethrough, the vertical portion of which communicates with the steam space between the container and jacket, while the horizontal portion communicates with a chamber 29 having a threaded nipple 29′ engaged in the outer end of the plug. The outer end of the chamber is closed by a cap 30, and held at its marginal edges, between the chamber and cap, is a diaphragm 31. Secured in the center of the diaphragm 31 is a stem 32, the same being slidably disposed through an opening in the cap and projecting through a guide 33 on the cap. Mounted on the cap is a plate 30' having steam pressure graduation marks, and inwardly of each mark is an opening 34 for the removable engagement of a pin 35. Pivotally mounted on the plate 30', and arranged to traverse the graduation marks thereon, is an indicating hand 36, the pivotal end of which is formed with an extension 37 against which the outer end of the stem 32 is arranged to engage to cause the swinging of the hand over the dial, as the diaphragm is moved by the steam pressure from within the jacket.

Secured within the opening 14 of the container, and a like opening 14', in the wall of the jacket, is a bushing 38. Rotatably disposed in this bushing is a turn plug valve 39 having a vertical longitudinal passage 40 which terminates at one end adjacent the inner end of the plug, and extends through the outer end thereof. In one side of the inner end of the plug 39 there is formed a short passage 41 which, when the plug is turned to a certain point, will register with the vertical opening or passage 42, in the ring 25, to permit steam from the jacket to pass into the interior of the container. In the inner end of the central opening of the bushing 38, and at one side thereof, there is formed a short inclined passage 43, which, when the valve plug is turned into another position, will communicate with the inner end of the passage 40, and permit steam to exhaust from the interior of the container to the atmosphere. A handle 44 is carried by the outer portion of the valve plug 39, for manual rotation thereof. Each bushing 27 and 38 serves as a pivot for an arm of the bail 45 of the cooker, a screw 46 being engaged through the center of the bail for engagement in a socketed boss 47 formed on the crown of the cover 48. The cover 48 is provided with a beveled flange 48' which is seated on the beveled face 25' of the ring 25, as clearly seen in the sectional view Figure 3.

Referring particularly to Figure 6, there is shown a modification of the device wherein the container 13' and the jacket 20' are formed from a single sheet of metal, the upper edges of the walls of which are connected by the bight portion 49 having a beveled face 49' on which is seated the beveled flange 50' of the cover 50. The lower edge of the jacket wall 20' is turned horizontally outward and secured onto the base 10' by means of the retaining ring 51. The peripheral edge of the cover 50 is formed with a flange 52 having openings 53 which receive the upper threaded ends of the vertical rods 54 which are disposed upwardly through the peripheral edge portion of the base.

When it is desired to cook foods by steam, the valve 39 is turned so as to establish direct communication between the steam space between the container and jacket and the interior of the container, through the passages 41 and 42. Steam will then flow into the container and act on the food. In this position of the valve the handle 44 extends vertically downwardly. When the handle is swung to extend horizontally toward the right the inner end of the passage 40 will register with the inner end of the passage 43, so that the steam arising from the cooking food within the container, can escape to the atmosphere. When the handle is swung vertically upward the inner end of the passage 40 registers with the passage 42, so that the steam can be exhausted from the jacket, thereby creating a vacuum, between the jacket and container, so that the heat within the container will be maintained.

The pressure of the steam in the jacket will be indicated by the position of the hand 36, when moved by the diaphragm 31. The inner end of the stem 32 is in the form of a valve which is arranged to be seated over the opening of the nipple 29', so that when the pressure is reduced the valve will hold the pressure within the jacket. When, however, the pressure rises above the predetermined degree, the diaphragm will be moved and the hand turned on the dial to the mark indicating such pressure. The pressure can be regulated by placing the pin 35 in the opening 34 adjacent the degree at which the hand is to stop.

What is claimed is:

1. A cooking device including a food container and a surrounding jacket spaced therefrom, the space between the jacket and container constituting a steam generating chamber, and a single means for exhausting steam from the steam chamber, exhausting steam from the container, and conducting steam from the steam chamber to the container.

2. A cooking device including a food container and a surrounding jacket forming a steam generating space therebetween, and a valve disposed through the walls of the container and jacket and arranged to be moved to direct steam from the jacket to the interior of the container, to exhaust steam from the container to the atmosphere, and to exhaust steam from the jacket to the atmosphere.

3. A cooking device including a food container and a jacket surrounding the container and forming a steam generating space therebetween, a pressure gage communicating with the steam generating space, a bushing disposed through the walls of the container and jacket, the inner end portion of the wall of the bore of the bushing having an inclined passage, the bushing having a lateral passage communicating with the steam generating space, and a valve turn plug mounting the bushing and having a short passage adapted for registry with the first passage at times, with the second passage at times, said valve having a longitudinal passage for communication with the first passage of the bushing and with the atmosphere, at times.

4. A cooker including a food container and a surrounding jacket forming a steam generating space therebetween, a ring sealing the space between the upper edge portions of the container and jacket walls and having transverse passages therethrough and downwardly extending passages communicating with the steam generating space, a steam gage in one of the transverse passages and having communication with the downwardly extending passage of the ring, and a valve in the other passage having means for communication with the interior of the container and the steam generating space, at times, with the interior of the container and the atmosphere, at times, and with the steam generating space and the atmosphere, at times.

In testimony whereof, I affix my signature, in the presence of two witnesses.

HORACE HULL.

Witnesses:
L. A. BASTIN,
W. N. LOGAN.